(12) United States Patent
Imahase et al.

(10) Patent No.: US 6,910,775 B2
(45) Date of Patent: Jun. 28, 2005

(54) PROJECTION-TYPE VIDEO DISPLAY

(75) Inventors: Taro Imahase, Fujisawa (JP); Satoshi Ouchi, Kamakura (JP); Tetsu Ohishi, Hiratsuka (JP); Tomohiro Miyoshi, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 225 days.

(21) Appl. No.: 10/346,380

(22) Filed: Jan. 15, 2003

(65) Prior Publication Data
US 2003/0227578 A1 Dec. 11, 2003

(30) Foreign Application Priority Data
Jun. 6, 2002 (JP) ........................................ 2002-165056

(51) Int. Cl.[7] .............................................. G03B 21/14
(52) U.S. Cl. .................. 353/31; 353/20; 349/5
(58) Field of Search .............................. 353/20, 31, 33, 353/34, 37; 349/5, 7, 8, 9

(56) References Cited

U.S. PATENT DOCUMENTS

| 6,183,091 B1 | 2/2001 | Johnson et al. | |
| 6,419,362 B1 * | 7/2002 | Ikeda et al. | 353/20 |
| 6,678,015 B2 * | 1/2004 | Yi et al. | 348/782 |
| 6,698,896 B2 * | 3/2004 | Suzuki et al. | 353/33 |
| 6,747,709 B2 * | 6/2004 | Kwon et al. | 349/9 |
| 2003/0107809 A1 * | 6/2003 | Chen et al. | 359/498 |

FOREIGN PATENT DOCUMENTS

| JP | 2001-154152 | 6/2001 |
| JP | 2001-154268 | 6/2001 |
| JP | 2001-154294 | 6/2001 |
| JP | 2001-228440 | 8/2001 |

* cited by examiner

*Primary Examiner*—William C. Dowling
(74) *Attorney, Agent, or Firm*—Townsend and Townsend and Crew LLP

(57) ABSTRACT

A projection-type display apparatus is improved in contrast by an overlap between a band of light to be cut off by a notch filter and a band of light wavelengths to which the polarization converting efficiencies of first and second specific-wavelength converter elements are 50%, respectively.

20 Claims, 13 Drawing Sheets

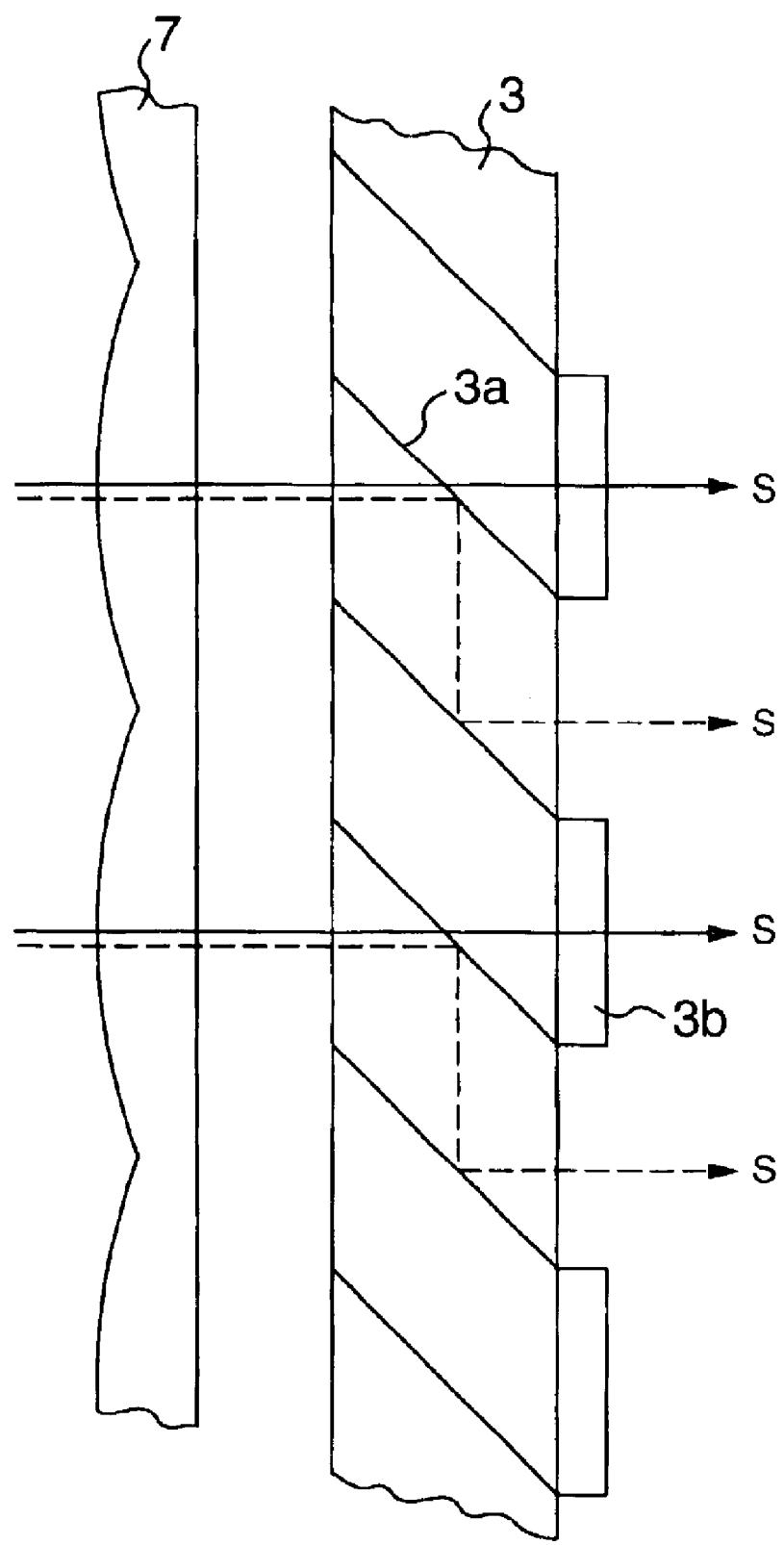

PROJECTION-TYPE VIDEO DISPLAY

BACKGROUND OF THE INVENTION

The present invention relates to a projector using light bulb elements such as transmissive liquid crystal panels or reflective video display devices to project video images on a screen, or to a projection-type video display apparatus such as a liquid crystal projector, reflective video display projector or projection-type display.

There is known a projection-type video display apparatus of which the color separation/combining unit is constructed by a combination of PBS and dichroic prism for reflective video display devices as disclosed in JP-A-2001-154268.

SUMMARY OF THE INVENTION

An object in the projection-type video display apparatus including the display apparatus described in the above gazette is to increase the contrast.

In order to achieve the above object, the present application provides a projection-type video display apparatus having a light source unit for emitting light, an illumination optical system for causing the light from the light source unit to be irradiated onto video display devices, the video display devices of light bulb unit for forming optical images according to a video signal, a color separation/combining unit for separation and combining of color, and projection unit for causing the light from the video display devices to be projected, wherein the color separation/combining unit includes a predetermined-band cutting-off element for cutting off only a predetermined wavelength band of incident light, at least one polarization separation element for separating light into transmitted light and reflected light by polarization, and at least two specific-wavelength converter elements for rotating only the polarization of specific wavelengths, the first one of which is placed on the light source unit side of the polarization separation element, and the second one of which is placed on the projection unit side of the polarization separation element, said video display devices are placed on the sides on which the light from the light source unit is transmitted through and reflected from the separation surface of the polarization separation element, and the band between a wavelength of light to which the polarization changing efficiency of the first specific-wavelength converter element is about 50% and another wavelength of light to which the polarization changing efficiency of said second specific-wavelength converter element is about 50% includes the same band as does the predetermined band to be cut off by the predetermined-band cutting-off element.

Other objects, features and advantages of the invention will become apparent from the following description of the embodiments of the invention taken in conjunction with the accompanying drawings.

BRIEF DESCRIPTION OF THE DRAWINGS

FIG. 2 is a diagram of an embodiment of a polarization-converting device for use in the invention.

DESCRIPTION OF THE EMBODIMENTS

Embodiments of the invention will be described with reference to the accompanying drawings.

Figure 1:
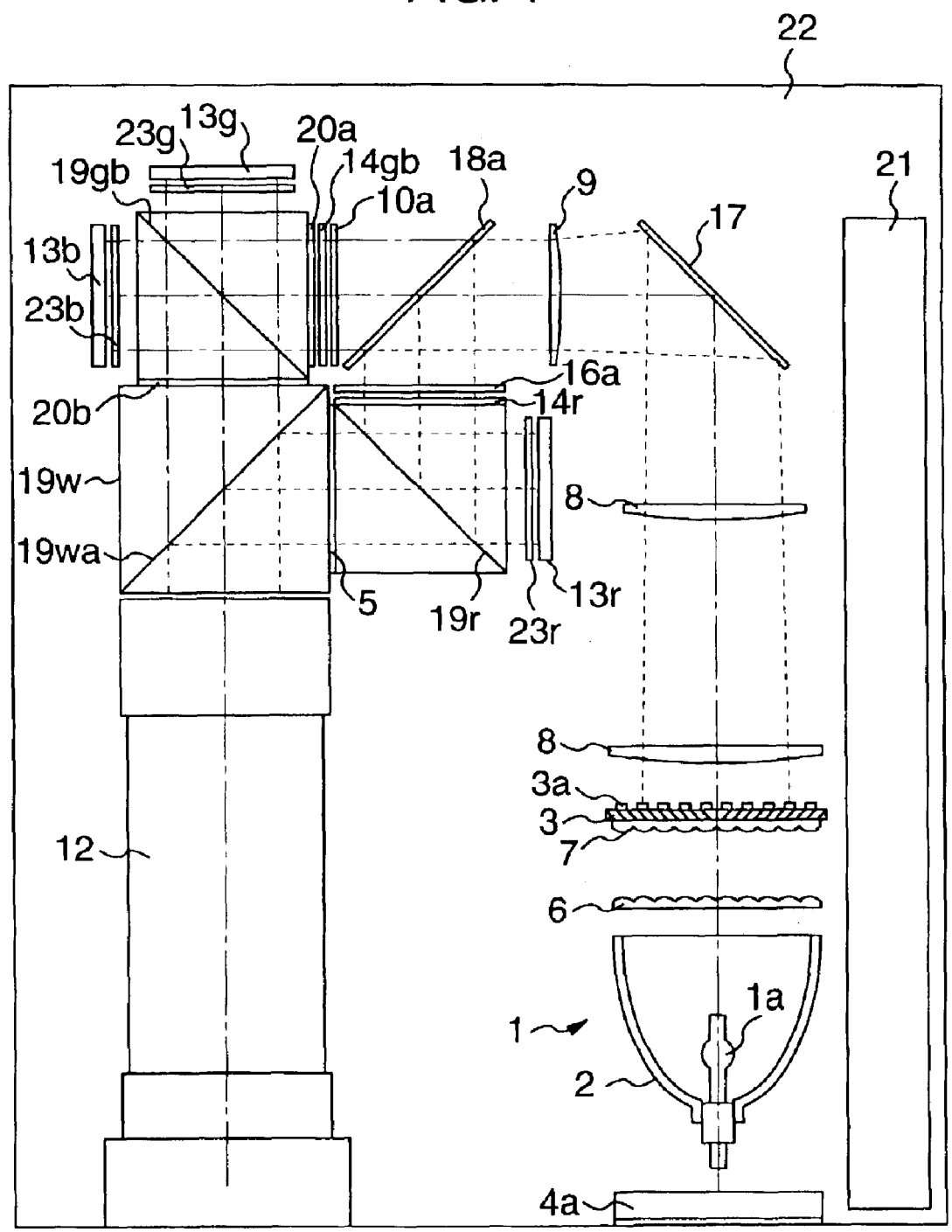
FIG. 1 is a construction diagram of the first embodiment of the projection-type video display according to the invention.

FIG. 1 is a construction diagram of the first embodiment of the invention, showing a projection-type video display apparatus 22 using three reflective video display devices 13 as light bulbs.

The projection-type video display apparatus 22 has a light source unit 1 including a light source 1a. The light source 1a is a white light lamp such as ultra-high pressure mercury lamp, metal halide lamp, xenon lamp, mercury xenon lamp or halogen lamp.

The rays of light emitted from the light source 1a as a bulb are gathered and reflected by an ellipsoidal, parabolic or aspheric reflector 2. Since the heat from the light source 1a heats the light source 1a and reflector 2 to a high temperature, a cooling fan 4a is provided at the back of the light source unit 1 to cool the light source 1a and reflector 2.

A first array lens 6 is constructed by a plurality of condensers and set in a rectangular frame of substantially the same size as the emission opening of this reflector 2. The light rays from the lamp unit 1 are incident to and collected by the first array lens 6 in order to produce a plurality of secondary light source images. In addition, a second array lens 7 is constructed by a plurality of condensers and disposed near the place where the plurality of secondary light source images is produced. The light rays from the first array lens 6 are passed through the second array lens 7 to form the individual lens images of the first array lens 6 on the liquid crystal display devices 13. The light rays exiting from the second array lens 7 are incident to a polarization-converting device 3 that is arranged to comply with the lateral pitch of the optical axes of each lens of the second array lens 7. The polarization-converting device 3 is constructed by rows of rhombic prisms of substantially ½ size as large as each lens width.

FIG. 2 shows light paths in the polarization-converting device 3 for use in this embodiment. This prism surface has a polarization separation film 3a that separates the incident light into P-polarized light and S-polarized light. The P-polarized light penetrates the polarization separation film 3a, and is rotated 90° in polarization direction by a λ/2-phase difference plate 3b provided at the exist surface of this prism, thus changed to S-polarized light, and then it exits from the polarization-converting device 3. On the other hand, the S-polarized light of the incident light is reflected from the polarization separation film 3a and again reflected in the original optical-axis direction within the adjacent rhombic prism, thus exiting from the polarization-converting device 3. In this embodiment, since S-polarized light is incident to the color separation/combining unit of prism structure that will be described later, the S-polarized light exits from the polarization-converting device 3.

A collimator lens 8 has positive refracting power to collect light, and the light from the collimator lens 8 is reflected about 90 degrees by a reflecting mirror 17, and passed through a condenser lens 9, thus irradiating the three reflecting liquid crystal display devices 13r, 13g and 13b of each color RGB.

The light passed through the condenser lens 9 is split into two parts, or GB light and R light by a color separation mirror 18a or color separation prism not shown. The GB light is passed directly through the mirror 18a, but the R light is deflected about 90 degrees perpendicularly. The GB light and R light are respectively directed toward polarization beam splitters (hereafter, abbreviated PBS) 19gb, 19r of which the films are designed to make the contrast satisfactory only for each wavelength region.

The R light reflected from the color separation mirror 18a is incident to a dichroic filter 16a. This dichroic filter 16a allows red light to pass therethrough, and reflects light of yellow to blue. The color separation mirror 18a is set to have a transmissivity of 50% to a wavelength of about 575 nm, while the dichroic filter 16a is set to have a transmissivity of 50% to a wavelength of about 600 nm. The dichroic filter 16a cuts off the yellow light so as to improve the color balance of white and the color purity of one color of red, green. Since the dichroic filter 16a is disposed substantially perpendicular to the optical axis, or for the incident angle to be substantially zero, it has less half-value shift due to incident angle than the color separation mirror 18a disposed about 45 degrees tilted to the optical axis. Since the dichroic filter 16a is disposed at the reflected-light side of the color separation mirror 18a as in this embodiment, it is able to cut off the leaked yellow component to improve the color balance of white and the color purity of green and red.

The light from the dichroic filter 16a is passed through an R-only incidence polarizing plate 14r for increasing the polarization degree, and is incident to an R-only PBS 19r. Since the light is S-polarized light, it is reflected from the polarization separation film surface to the R reflective liquid crystal display device 13r side, irradiating it. The B light and G light passed through the color separation mirror 18a are incident to a notch filter 10a. The notch filter 10a is so set that, as for example shown in FIG. 7, the fall half-value and rise half-value of the transmissivity are 480 nm and 525 nm, respectively, thus cutting off cyan light. Since the notch filter 10a is disposed substantially perpendicular to the optical axis of incident light, or for the incident angle to be about zero, it can reduce the leakage of light due to the half-value deviation depending on the incident angle, thus improving the color balance of white and the color purity of green and red. The light passed through the notch filter 10a is incident to a GB-only polarizing plate 14gb that is disposed to increase the polarization degree. The GB-only polarizing plate 14gb is set to cut off particular polarized light, or P-polarized light in this embodiment. The light improved in the polarization degree after being passed through the GB-only polarizing plate 14gb is incident to a specific-wavelength converter element 20a.

The specific-wavelength converter element 20a changes the polarization direction of only the light of a particular wavelength region. In this embodiment, the G light and the cyan light leaked from the notch filter are forced to exit as they are S-polarized, but the B light is converted from the S-polarized light to the P-polarized light, and then caused to exit. The B-light as the P-polarized light is passed through the polarization-separating film surface of the GB-only PBS 19gb to irradiate the B reflective liquid crystal display device 13b. The G-light and cyan light as the S-polarized light are reflected from the polarization-separating film surface of the GB-only PBS 19gb, and then incident to a G reflective liquid crystal display device 13g.

Then, the reflective video display devices 13 for respective colors change the polarization of light, and the light rays from the display devices are again incident to the PBS 19r and PBS 19gb, where the S-polarized light is reflected and the P-polarized light is transmitted therethrough. Each reflective video display device 13 has liquid crystal display element trios of the number (for example, 1365 pixels by 768 pixels of three colors each) corresponding to the pixels to be displayed. The polarization angle of each pixel of the display device 13 is changed by the drive signal fed from the external. When the polarization directions of light are matched with each other, the PBS 19gb detects the G light and B light, and the PBS 19r detects the R light. The amounts of light rays having the intermediate polarization angles, detected by the PBS are determined by the relation between the polarization degrees of the PBS 19gb and PBS 19r to light. Thus, a video image is displayed according to the input signal fed from the outside. At this time, when the reflective video display devices 13 display black, the polarization directions are substantially the same as the incident light rays, and the rays of light are fed directly back to the light source side along the incident light path.

When the reflective liquid crystal display device 13g for G displays black, the G light of S-polarized light is incident to the PBS 19gb, and thus the PBS film surface associated therewith has a performance of the reflectivity and transmissivity to the incidence of S-polarization light. The contrast is the ratio between them (Hereafter, this is abbreviated the contrast to the S-polarized light incidence). When the reflective liquid crystal display device 13b for B displays black, the B light of P-polarized light is incident to the PBS 19gb, and thus the PBS film surface associated therewith has a performance of the transmissivity and reflectivity to the P-polarization light incidence. The contrast is the ratio between them (hereafter, this is abbreviated the contrast to the P-polarized light incidence). The film of the PBS 19gb is designed so that the contrast to the S-polarized light incidence is the highest for the G-light band, and that the contrast to the P-polarized light incidence is the highest for the B-light band.

The contrast can be improved by rotating in an adjusting manner the ¼ wavelength phase difference plates disposed just before the reflective liquid crystal display devices 13r, 13g, 13b.

Then, the G light and cyan light of P-polarized light and B light of S-polarized light are incident to a specific wavelength-converter element 20b for changing the polarization direction of only a specific wavelength region. The specific wavelength-converter element 20b in this embodiment converts the polarization direction of only B light. The G light and B light, and the cyan light are incident to a PBS 19w as P-polarized light and as S-polarized light, respectively.

Figure 3A:
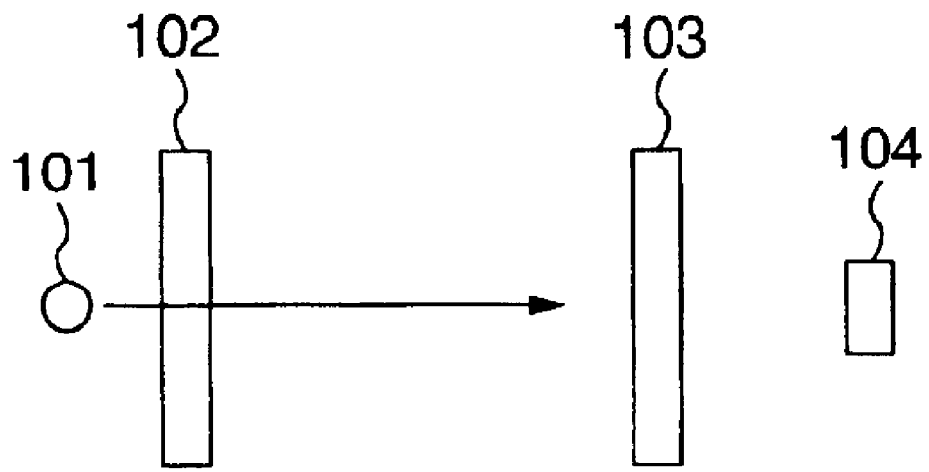
FIGS. 3A and 3B are diagrams useful for explaining the measurement of the transmission factors of the specific-wavelength converter elements used in the invention.
Figure 3B:
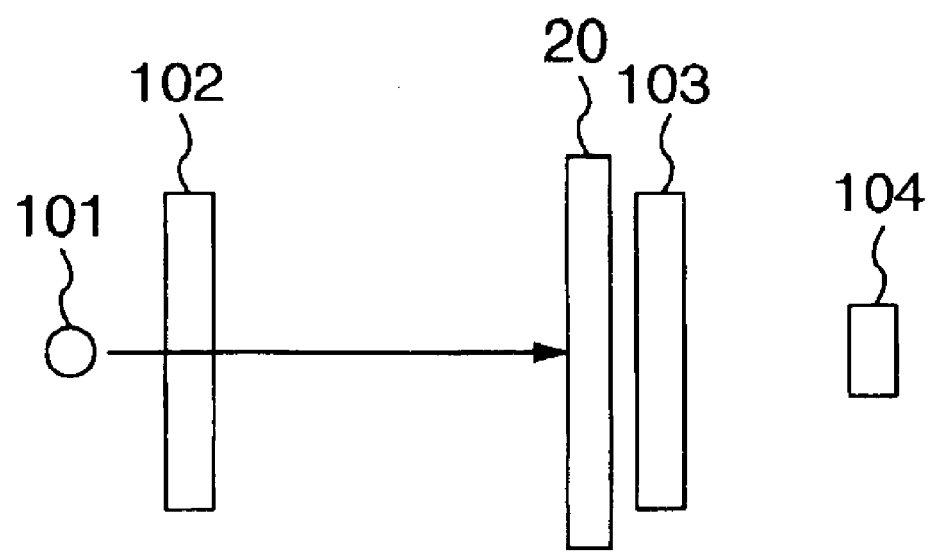

FIGS. 3A and 3B show a method for measuring the transmissivity of the specific-wavelength converter element. When an aperture diaphragm is provided after a light source 101, the spread of incident light to the object being measured is substantially F20. Light exits from the light source 101 for measurement. The light passes through an incident-side measuring polarizing plate 102, and it passes through the specific-wavelength converter element 20 and through an exiting-side measuring polarizing plate 103, and is incident to a measuring light-sensitive device 104. Thus, the intensity of the transmitted light can be measured. Two different transmission factors were measured when the polarization axes of the incident-side measuring polarizing plate 102 and exiting-side measuring polarizing plate 103 were orthogonalized and aligned parallel to each other. Specifically, the measurement was made as follows. The polarization axes of two polarizing plates were aligned in parallel with the specific-wavelength converter element 20 not provided in order to remove the effect of the transmissivities of the polarizing plates as shown in FIG. 3A, and the transmissivities were measured and used as 100%. Then, as shown in FIG. 3B, the specific-wavelength converter element 20 was disposed, and the incident-side measuring polarizing plate 102 was disposed to allow the S-polarized light to transmit therethrough, and the exiting-side measuring polarizing plate 103 was disposed to allow the S-polarized light to transit therethrough. Under this condition, the transmissivities corresponding to the above parallel mode were measured. In addition, the exiting-side measuring polarizing plate 103 was disposed to allow the P-polarized light to pass therethrough, and the transmissivities corresponding to the above orthogonal mode were measured.

Figure 4A:
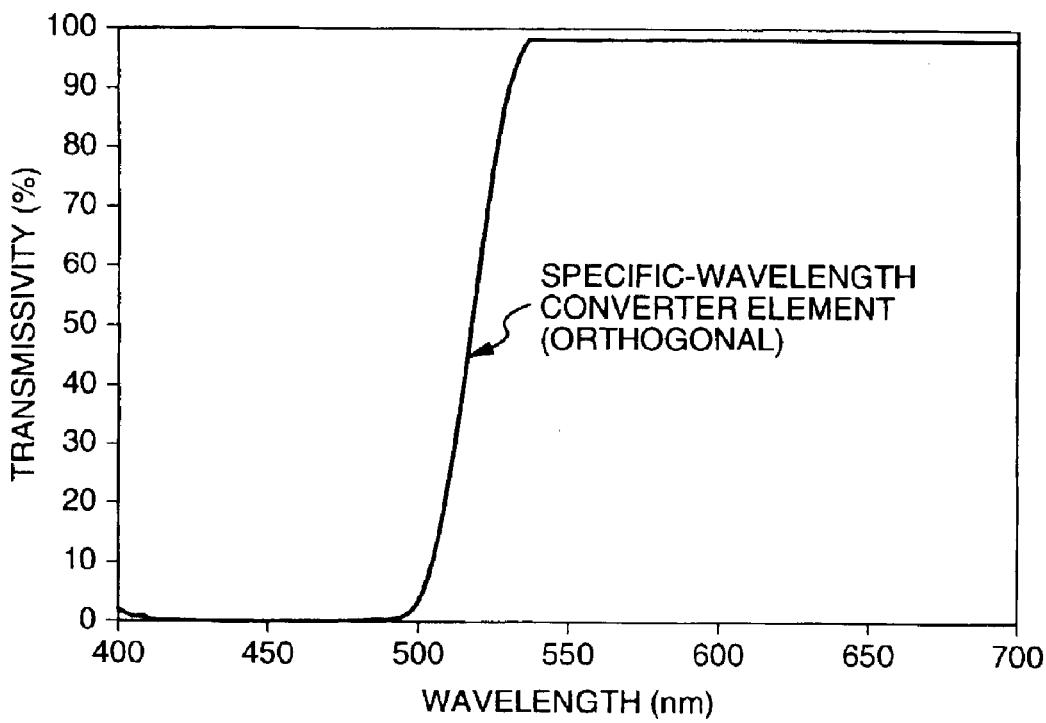
FIGS. 4A and 4B are graphs showing the results of the measurement of the transmission factors.
Figure 4B:
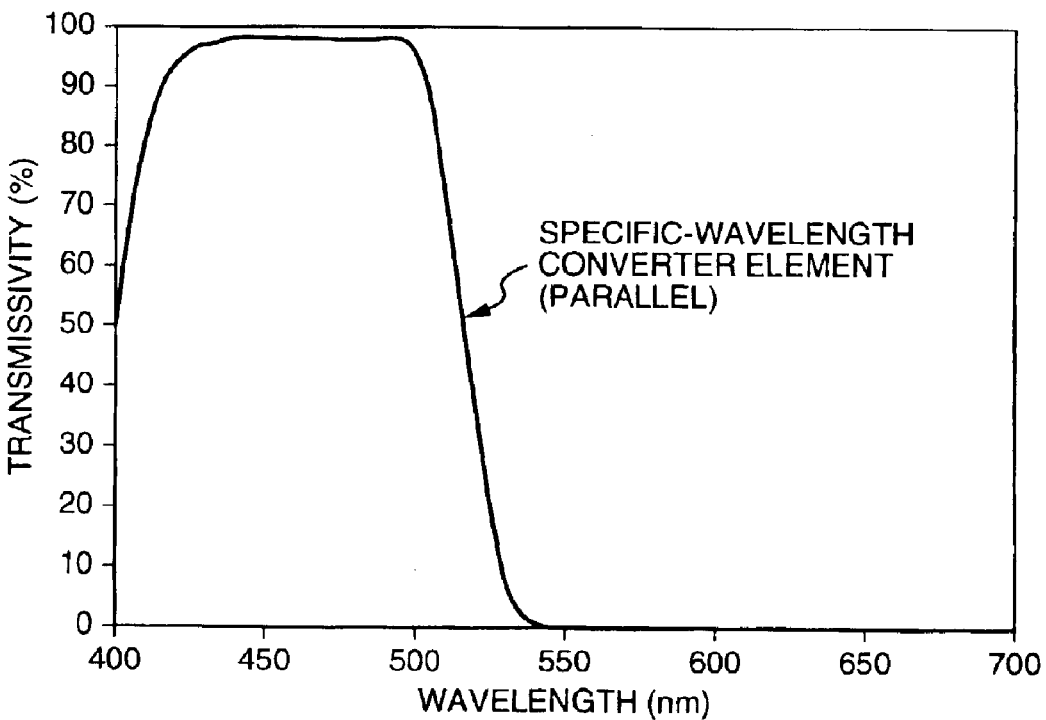

FIGS. 4A and 4B show the measured results. The transmissivities obtained when the polarization axes were orthogonalized indicate the percentage of the light of which the polarization was changed 90 degrees by the specific-wavelength converter element 20. The transmissivities obtained when the polarization axes were aligned in parallel show the percentage of the light of which the polarization was not rotated by the plate 20.

Figure 5:
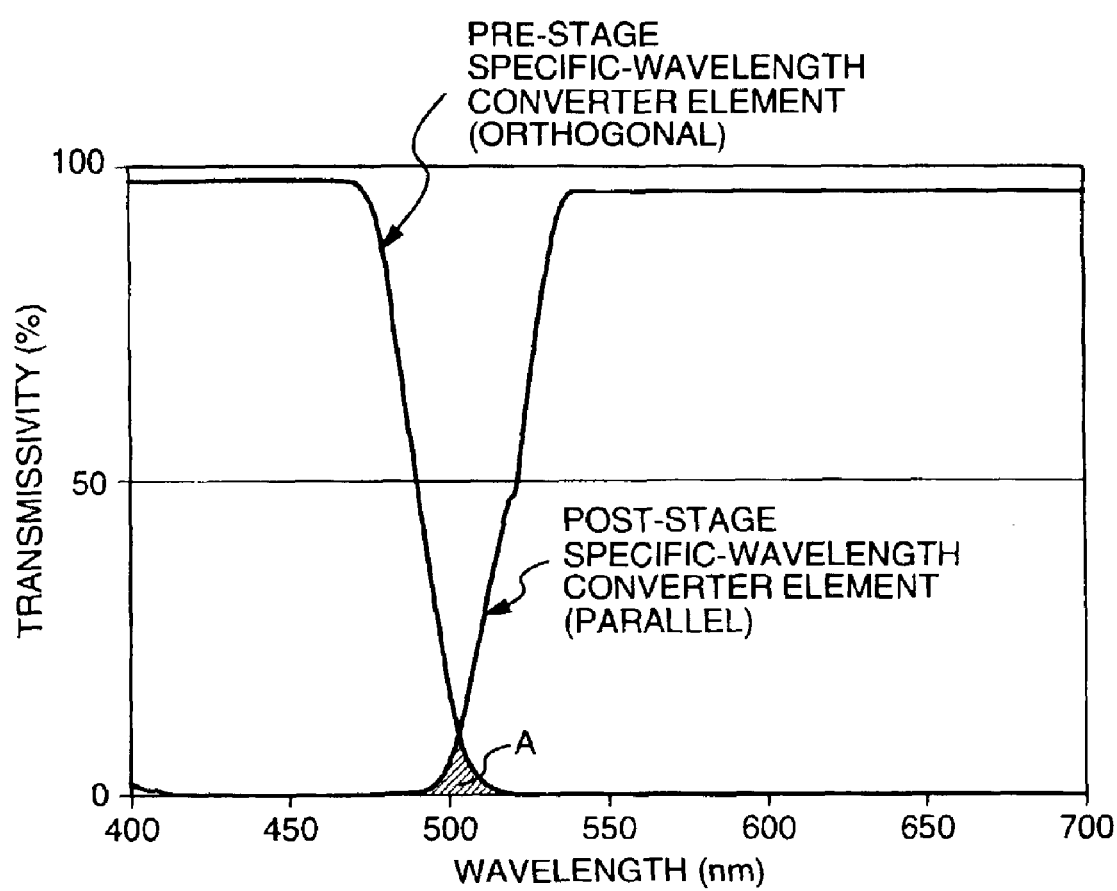
FIG. 5 is a graph showing the transmission factors of the pre-stage and post-stage specific-wavelength converter elements.

FIG. 5 shows the transmission factors of the pre-stage and post-stage specific-wavelength converter elements 20a and 20b. The light of the band region shaded below the intersection between the two transmissivity-curves leaks in, reducing the contrast.

Figure 6:
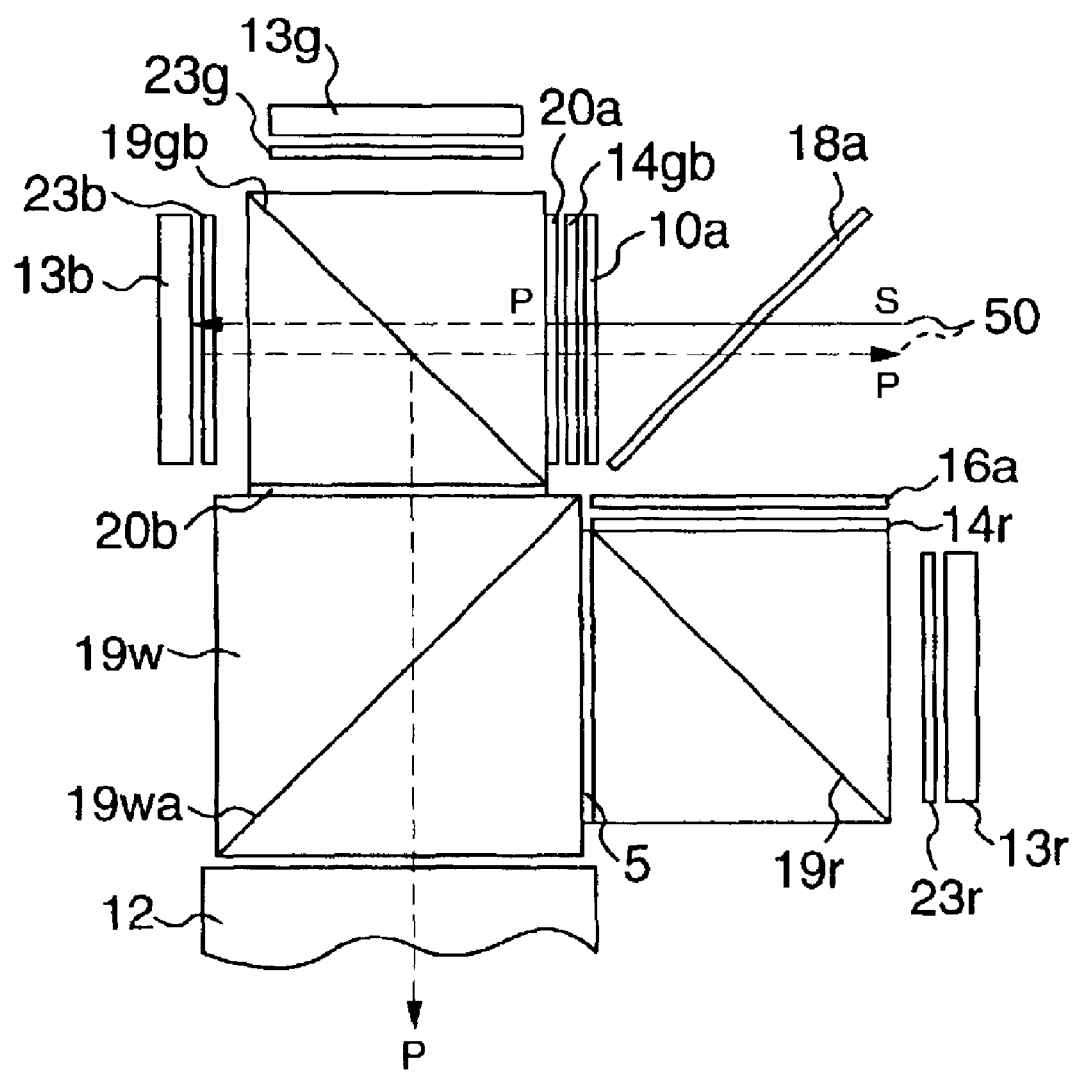
FIG. 6 is a diagram useful for explaining the leakage of light between the pre-stage and post-stage specific-wavelength converter elements.

FIG. 6 is a diagram useful for explaining the leakage of light associated with the pre-stage and post-stage specific-wavelength converter elements 20a, 20b. The blue light path will be described here. The P-polarized light is represented by broken lines, and the S-polarized light by a solid line. Of the GB light incident to the pre-stage specific-wavelength converter element 20a, a part corresponding to the percentage of the orthogonal-mode transmissivity of the pre-stage plate 20a shown in FIG. 5 is changed to P-polarized light, and another part corresponding to the percentage of the parallel-mode transmissivity exits as it is S-polarized. The P-polarized light passes through the GB-only PBS 19gb, and is incident to the reflective liquid crystal display device 13b for B. When black is displayed, the P-polarized light exits as it is and it is again incident to the GB-only PBS 19gb. When the P-polarized light is incident, about 5% of the light is reflected from the PBS film surface, and incident to the post-stage plate 20b. Of this incident light, a part corresponding to the percentage of the parallel-mode transmissivity of the post-stage plate 20b exits as it is P-polarized, and another part corresponding to the percentage of the orthogonal-mode transmissivity is changed to S-polarized light. The P-polarized light penetrates the PBS 19w to leak in the projection lens, thus reducing the contrast. The above description will be summarized as follows. The light proportional to the product of the orthogonal-mode transmissivity and parallel-mode transmissivity of the pre-stage plate 20a and post-stage plate 20b reduces the contrast. This is why the band of the region (for example, the shaded region in FIG. 5) lying below the intersection of the two transmissivity curves causes the reduction of contrast. Thus, if this band is cut off by the notch filter, or in this embodiment if it is prevented from being reflected to the light source side and from being incident to the video display devices, the contrast can be improved.

Figure 7:
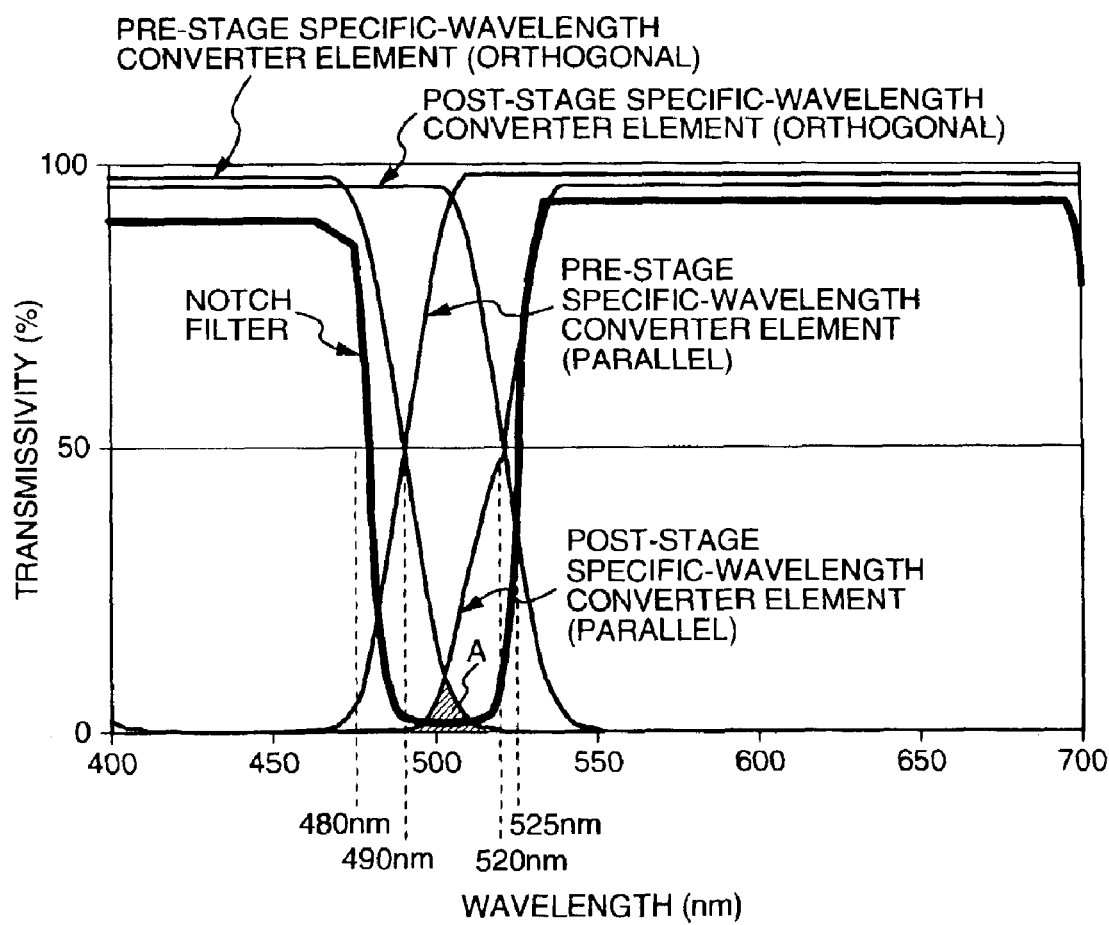
FIG. 7 is a graph showing the transmission factors of the pre-stage and post-stage specific-wavelength converter elements and a notch filter used in the invention.

Accordingly, it will be understood that the contrast can be improved if as shown in FIG. 7 the pre-stage plate 20a and the post-stage plate 20b are respectively designed to have half-values at 490 nm, 520 nm and the intersection band ranging from 500 nm to 510 nm, and if the cut-off band of the notch filter 10a to be disposed is selected to be wider than the intersection band, for example, to have the fall half-value at 480 nm and the rise half-value at 525 nm in order to cut off the light over the band. If the transmissivity of the notch filter 10a to the cut-off band can be reduced as low as possible, the leaked light can be decreased the more, leading to further improvement in the contrast on the screen. In addition, since the notch filter 10a also serves to cut off the cyan light, the white balance and the color purity of G and B can be improved on the screen. Alternatively, the efficiency may be given priority with the fall half-value and rise half-value of the notch filter being set at 495 nm and 515 nm.

Figure 8A:
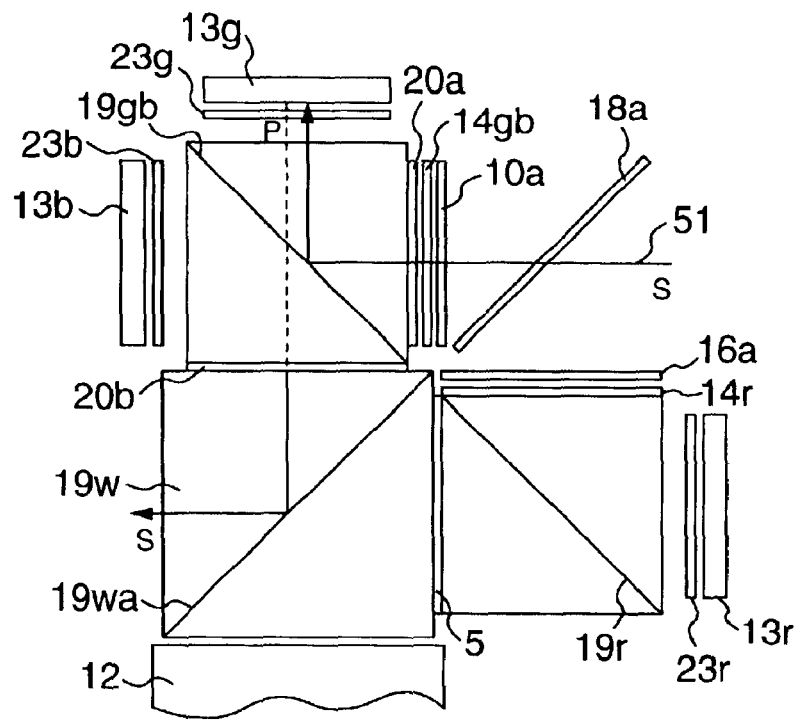
FIGS. 8A and 8B are diagrams to which reference is made in explaining the cyan light path in the invention.
Figure 8B:
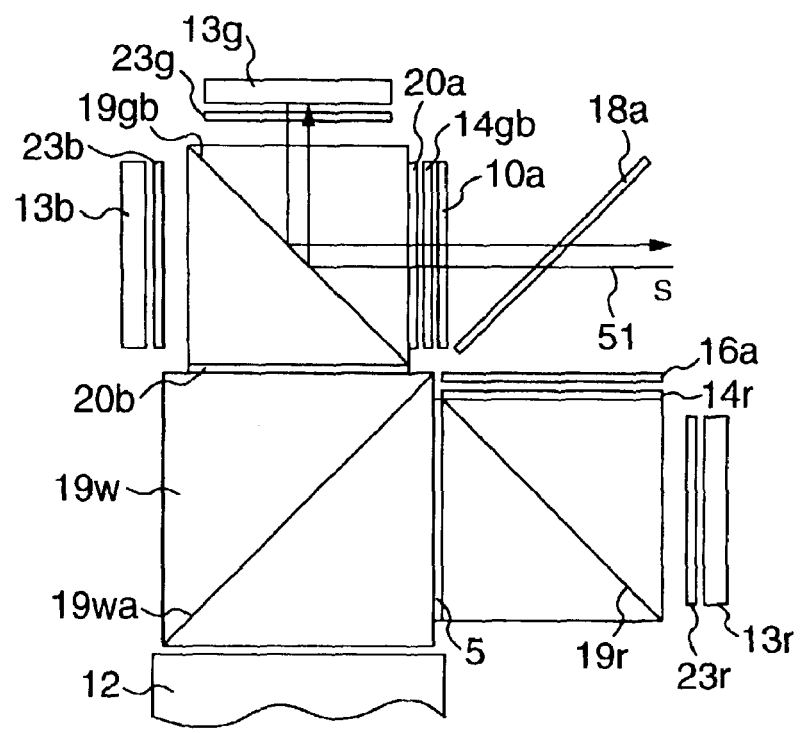

FIGS. 8A and 8B show the paths of cyan light in this embodiment. FIG. 8A shows the paths along which light passes when the reflective video-display devices 13 display white, and FIG. 8B shows the paths along which light passes when they display black. The light of the wavelengths between the half-values of the pre-stage and post-stage specific-wavelength converter elements, here cyan light, is cut off. In this embodiment, the cyan light is caused to go to the better-contrast S-polarized light incident side (the G reflective video display device side). Specifically, the half-value of the pre-stage plate 20a is caused to be closer to the half-value of the post-stage plate 20b toward 550 nm. The half-values of the pre-stage plate 20a and the post-stage plate 20b are set at 490 nm and 520 nm, thus the half-value of the pre-stage plate being caused to be closer to 550 nm. Therefore, the cyan light goes toward the G-use reflective liquid crystal device 13g. Since the contrast characteristic of PBS 19 to S-polarized light incidence is better than to P-polarized light, the contrast is improved by cutting off when the S-polarized light is incident. The cyan light is reflected from the GB-only PBS 19gb and incident to the G-use reflective liquid crystal-display device 13g. When white is displayed, the light is converted to P-polarized light, exits and is again incident to the GB-only PBS 19gb. The light passes through the GB-only PBS 19gb, and is incident to the post-stage plate 20b. Of the incident light, the cyan light is converted to S-polarized light, and hence it is reflected, and cut off by the PBS 19w. When black is displayed, the light exits as it is S-polarized, and is again incident to the GB-only PBS 19gb. Of the incident light, about 0.1% of the S-polarized light passes through, thus does not reduce the contrast.

Figure 9A:
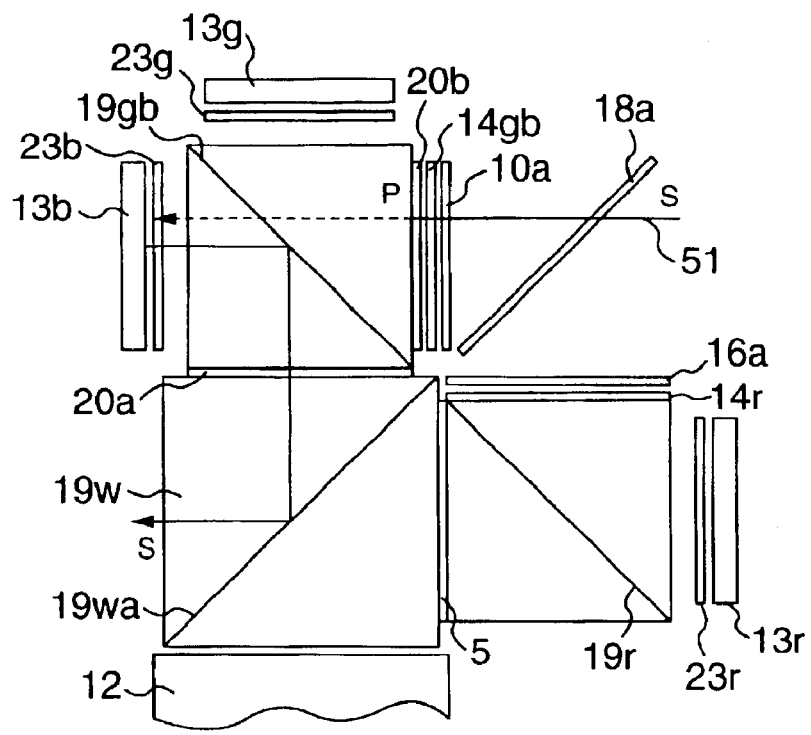
FIGS. 9A and 9B are diagrams to which reference is made in explaining the cyan light path of the case in which the present invention is not applied.
Figure 9B:
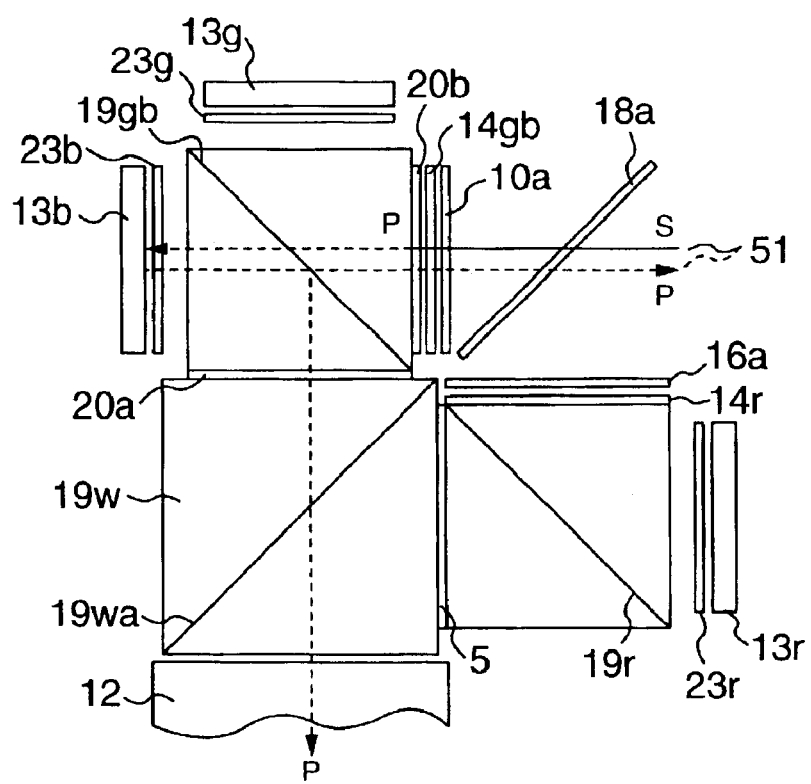

FIGS. 9A and 9B show the paths of cyan light when the half-values of the pre-stage and post-stage plates are set at 520 nm and 490 nm, respectively as opposed to this embodiment. The cyan light is incident to the B display device 13b. When white is displayed, the S-polarized light exiting from the B-use reflective liquid crystal display device 13b is reflected from the GB-only PBS 19gb, converted to S-polarized light by the plate 20a, and then reflected to be cut off by the PBS 19w. When black is displayed, the cyan light exits in a form of P-polarized light from the B-use reflective liquid crystal display device, but about 5% of the incident P-polarized light is reflected from the PBS film surface. The reflected light exists as it is P-polarized from the post-stage plate 20b, so that the contrast is reduced. Thus, it will be understood that the contrast can be improved by using the half-values in this embodiment as mentioned with reference to FIGS. 8A and 8B.

The wavelengths of ¼-wavelength phase-difference plates 23b and 23g for B and G are set within an intermediate region substantially between the bands of G and B. Specifically, the band of B is in the range from 420 nm to 490 nm, and the band of G in the range from 510 nm to 580 nm. Thus, the set wavelengths of the ¼-wavelength phase-difference plates 23b, 23g lie in the intermediate complementary color, or cyan band, for example, between 480 nm and 520 nm. Since the specific-wavelength converter elements 20 and PBS 19 leak light, each video display device 13 also receives incident light of the color that is to be fed to the adjacent display device 13, in addition to the original color. In other words, according to this embodiment, B light in addition to G light is incident to the G-use reflective video display device 13g, and G light in addition to B light is incident to the B-use reflective video display device 13b. Thus, with this construction, the contrast can be more effectively improved, and also the color balance of black can be improved.

Alternatively, the wavelength of the B-use ¼ wavelength phase difference plate 23b is set within a green wavelength region. The wavelength of the ¼-wavelength phase-difference plate 23b is selected, for example, between 530 nm and 570 nm. Since the specific-wavelength converter elements 20 and PBS 19 leak light, the color separated by PBS into other video display device 13 leaks in each video display device 13 in addition to the original color. In other words, according to this embodiment, G light in addition to B light is incident to the B-use reflective video display device 13b. Here, the G light is affected by visibility to much reduce the contrast. With this construction, the contrast can be enhanced more effectively and also the color balance of black can be improved.

Since the film surfaces of the PBS 19 can work to increase the contrast when the band of light is limited to be as narrow as possible, the PBS polarization separation films placed just after the video display devices can be formed not for RGB but for BG only according to the construction of this embodiment. Thus, the contrast in PBS can be increased, and also the contrast in the projection-type video display apparatus 22 can be improved.

The R light passed through the R-only PBS 19r is converted to S-polarized light by the ½ wavelength phase difference plate 5 and then incident to the PBS 19w. The PBS 19w mixes the R light and GB light on its polarization separation film surface 19wa, and supplies the mixture to the projection lens side, whereas the cyan light is reflected, thus cut off. Here, the polarization separation film 19wa of PBS 19w is designed so that the contrast in the case of S-polarized light incidence is higher in the band of G and B that is incident in a form of substantially S-polarized light when the reflective video display devices 13 display black, while the contrast in the case of P-polarized light incidence is higher in the band of R that is incident in a form of substantially P-polarized light when the reflective video display devices 13 display black.

The light passes through a projection lens 12 such as a zoom lens and arrives at the screen. The above projection lens 12 magnifies the images formed on the reflective video display devices 13r, 13g, 13b, and projects them on the screen, thus achieving the function of the projection-type display apparatus. A power supply 21 powers the light source 1a and video display devices 13, and the display devices are driven by respective drive circuits (not shown).

At this time, if necessary, another specific-wavelength converter element 20 for converting the polarization direction of specific wavelength regions is inserted and set on the exit side of the PBS 19w to change particular wavelength regions so that all color light of red, green and blue can have equal polarization direction, thus making it possible to use exit polarizing plates and polarization screen.

For example, since the PBS 19gb generally provides lower contrast for P-polarized light incidence than for S-polarized light incidence, the contrast of B is somewhat lower than that of G. If a blue-use polarizing plate (not shown) is provided after the exit of the PBS 19gb, the contrast of B can be increased, and the contrast balance of respective colors can be improved, thus leading to satisfactory color balance of black on the screen.

The PBS provides higher contrast for S-polarized light incidence than for P-polarized light incidence as described above. In this embodiment, the S-polarized off-light is at least once incident to the PBS in the course of passing along the light paths of RGB after exiting from the video display devices 13. If we consider it from the associated light path to the projection lens, the light passes through the PBS 19. In this embodiment, since the three colors once pass through the PBS, the contrast can be increased and the color balance of black can be improved.

Since the video display devices 13, polarizing plates 14 and ¼-wavelength phase-difference plates 23 may be deteriorated in their performance or damaged by high temperatures, a cooling fan is necessary to cool them.

If at least one of the polarizing plates 14 is of reflection type, the heat resistance can be increased. In other words, as one method for increasing the heat resistance, an optical system for assuring high contrast is constructed by using the reflective polarizing plates and PBS of higher heat resistance without use of absorption-type polarizing plates. Moreover, since the reflective video display devices 13 can have pixel-transistors provided behind the reflective mirror, they have larger effective areas than a transmissive video display device 13t, and thus absorb less heat even if the same amount of light flux is irradiated thereon. Therefore, they have an advantage from the heat point of view.

In this embodiment, the light from the G-use reflective liquid crystal display device 13g twice passes through the PBS 19 toward the projection lens. When black is displayed, the S-polarized light for better contrast is incident to the PBS 19, and thus the exiting G-light path has high contrast. Therefore, if each reflective liquid crystal display device provides the lowest contrast to G band, use of this construction will prevent the color balance of black from being deteriorated on the screen due to the reflective liquid crystal display devices.

In this embodiment, as compared with the G, B light path, the R light path does not include the notch filter 10 and the pre-stage and post-stage specific-wavelength converter elements 20, but includes the dichroic filter 14 and ½-wavelength phase-difference plate 5. Since the dichroic filter 14 can generally reduce the number of layers as compared with the notch filter 10 and thus increase the transmissivity the more, the R light path has higher efficiency than the G, B light path. In addition, since the specific-wavelength converter element 20 and ½ wavelength phase difference plate 5 have the same efficiency, the R light path has, by a value corresponding to one element, higher efficiency than the G, B light path. Thus, if the red R of three primary colors R, G, B of the light emitted from the light source unit 1 has the smallest amount of light, use of this construction will prevent the white balance on the screen from being deteriorated due to the light from the light source unit 1.

Figure 10:
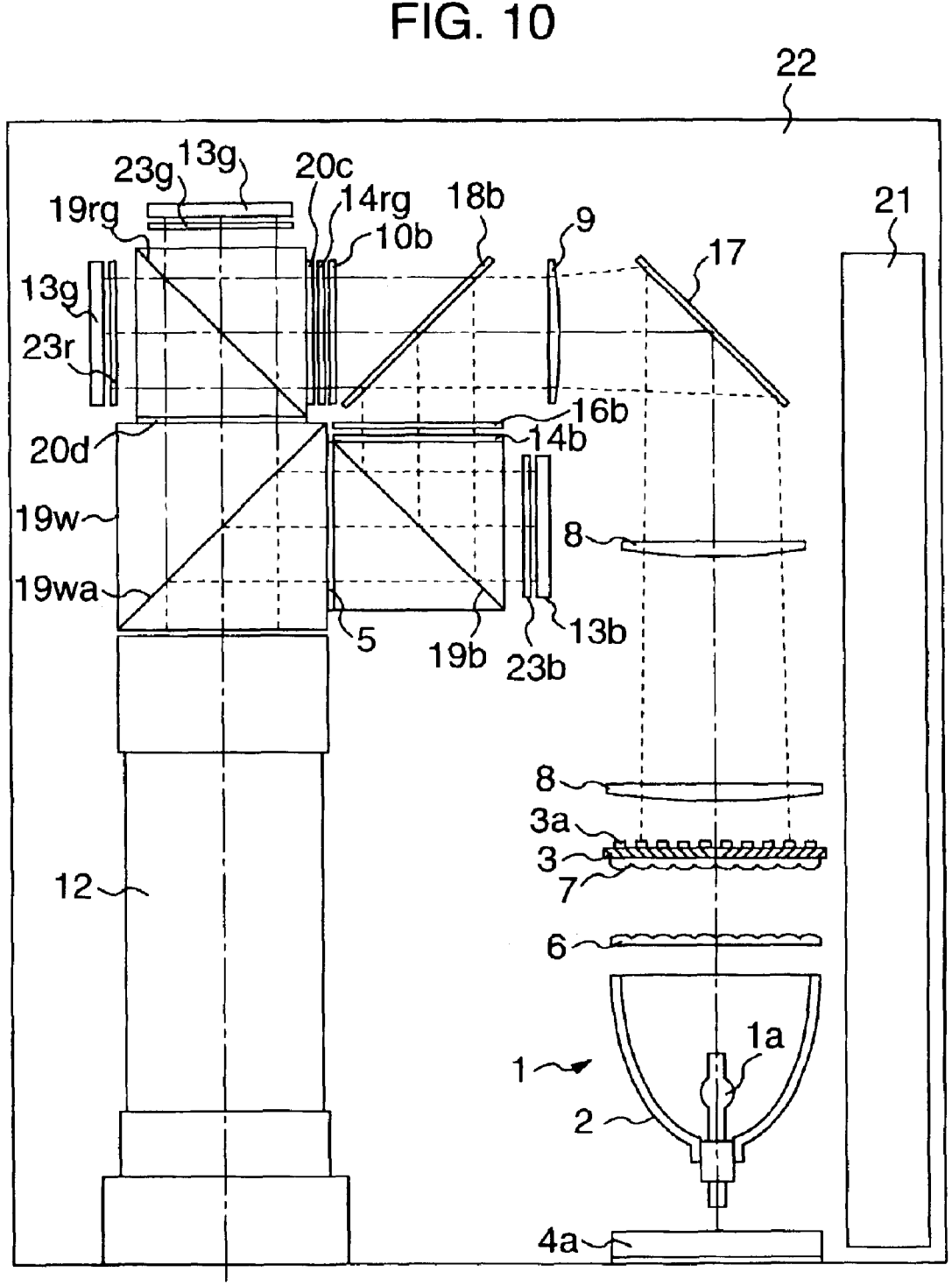
FIG. 10 is a construction diagram of the second embodiment of the projection-type video display apparatus according to the invention.

FIG. 10 is a construction diagram of the optical system of another embodiment of the projection-type video display apparatus 22 using the optical system according to the invention. This embodiment also uses the reflective video display devices 13. The construction and action of each component ranging from the light source 1a to the condenser lens 9 are the same as in the embodiment of FIG. 1. This embodiment is greatly different from the previous embodiment in that the B light is first separated by the color separation/mixing system. The light passed through the condenser lens 9 is first split into two parts, or GR light and B light by a color separation mirror 18b.

The B light reflected from the color separation mirror 18b is incident to a dichroic filter 16b. This dichroic filter 16b allows blue light to pass and colors of cyan to red to be reflected. The color separation mirror 18b is designed to allow wavelengths of about 500 nm to pass at a rate of 50%. The dichroic filter 16b is designed to allow wavelengths of about 480 nm to pass at a rate of 50%. The dichroic filter 16b cuts off the cyan light to improve the white balance and the color purity of simple color, blue and green.

Then, the B light passes through a B-only incidence polarization plate 14b, and is incident to a B-only PBS 19b. Since the light is S-polarized, it is reflected from the polarization separation film surface into the B-use reflective liquid crystal display device 13b, thus irradiating this display device. The R light and G light that passed through the color separation mirror 18b are incident to a notch filter 10b. The notch filter 10b is placed substantially perpendicular to the optical axis of incident light, or so that the incident angle is substantially zero. Thus, even if the half-value is deviated depending on the incident angle, light is less leaked. Also, the white balance and color purity of green and red can be improved. The notch filter 10b is designed so that the transmissivity has its fall half-value at 565 nm and its rise half-value at 615 nm as for example shown in FIG. 11, thus cutting off the yellow light. The light that passed through the notch filter 10b is incident to an RG-only polarizing plate 14rg placed to increase the polarization degree. The RG-only polarizing plate 14rg is set to cut off the P-polarized light. The light that passed through the RG-only polarizing plate 14rg, thus improved in its polarization degree, is incident to a specific-wavelength converter element 20c. The specific-wavelength converter element 20c changes the polarization direction of only a specific wavelength region. Here, The G light and the yellow light leaked from the notch filter are caused to exit as they are S-polarized, and the R light is converted from S-polarization to P-polarization and caused to exit. The R light of P-polarized light passes through the polarization separation film surface of RG-only PBS 19rg and irradiates the R-use reflective liquid crystal display device 13r. The G light and yellow light of S-polarized light are reflected from the polarization separation film surface of the RG-only PBS 19rg, and irradiate the G-use reflective liquid crystal display device 13g.

Subsequently, the polarization of light is changed by each reflective video display device 13, and the light is again incident to each-color PBS 19b, PBS 19rg, where the S-polarized light is reflected and P-polarized light passes. The reflective video display devices 13 change the polarization angle of each pixel according to the drive signal from the outside. The G, R light and B light with equal polarization direction are detected by the PBS 19rg and PBS 19b, respectively. The light of other polarization angles is detected, but the amount of detection depends on the relation of the polarization degree and PBS 19rg, 19b. Thus, video images are displayed according to the input signal from the outside. At this time, when the reflective video display devices 13 display black, the polarization direction is substantially the same as the incident light, and thus the light is fed back to the light source side along the incident light path.

Figure 11:
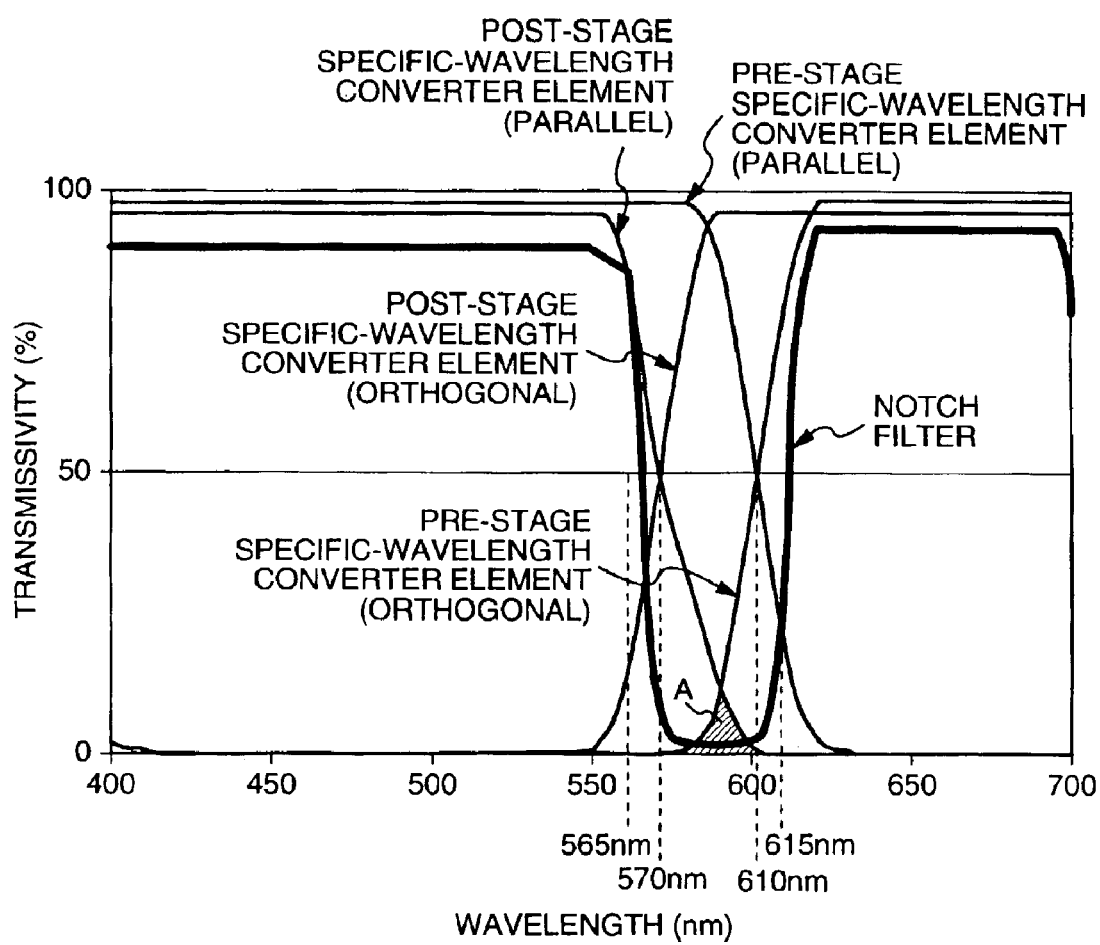
FIG. 11 is a graph showing the transmission factors of the pre-stage and post-stage specific-wavelength converter elements and the notch filter in this invention.

Then, the G light and yellow light of P-polarized light, and the R light of S-polarized light are incident to a specified-wavelength converter element 20d for converting the polarization direction of only a specific wavelength region. The specific-wavelength converter element 20d, here, converts the polarization of only R light and yellow light. Thus, the G light and R light as P-polarized light, and the yellow light as S-polarized light, are incident to the PBS 19w. The band below the intersection between the transmissivity curves of pre-stage and post-stage specific-wavelength converter elements 20c, 20d is leaked in, reducing the contrast. Here, the red light path will be described. Of the RG light incident to the pre-stage specific-wavelength converter element 20c, a part corresponding to the orthogonal-mode transmissivity percentage of pre-stage plate 20c as shown in FIG. 11 is converted to P-polarized light before exiting, and another part corresponding to the parallel-mode transmissivity percentage is caused to exit as it is S-polarized. The P-polarized light passes through the RG-only PBS 19rg, and incident to the B-use reflective liquid crystal display device 13r. When black is displayed, the light exits as it is P-polarized, and is again incident to the RG-only PBS 19rg. Of the incident P-polarized light, about 5% is reflected from the PBS film surface, and incident to the post-stage specific-wavelength converter element 20d. Of this incident light, a part corresponding to the parallel-mode transmissivity percentage of the post-stage specific-wavelength converter element 20d exits as it is P-polarized, and another part corresponding to the orthogonal-mode transmissivity percentage is changed to S-polarized light. The P-polarized light passes through the PBS 19w to leak in the projection lens, thus reducing the contrast. In other words, the light proportional to the product of the orthogonal-mode transmissivity of pre-stage plate 20c and that of the parallel-mode transmissivity of post-stage plate 20d reduces the contrast. This means that the band region below the intersection of the two transmissivity-curves causes the contrast reduction. Thus, the contrast can be improved if this band is cut off by the notch filter, or here by reflecting this band into the light source side so that it is prevented from being incident to the display devices.

Therefore, it will be understood that, in order to improve the contrast, it is necessary to set the half values of the pre-stage and post-stage plates 20c, 20d at 610 nm, 570 nm, respectively, and the intersection band region within the range from 580 nm to 600 nm, as shown in FIG. 11, and also to design the notch filter 10*b* to have a wider cut-off band than that, for example, here have a fall half-value at 565 nm and a rise half-value at 615 nm. The amount of leaked light can be suppressed the more by lowering the transmissivity of notch filter 10*b* to the cut-off band as much as possible, thus leading to the improvement in the contrast on the screen. In addition, this notch filter 10*b* also serves to cut off the yellow light, thus making it possible to improve the white balance and the color purity of single color G and B. Alternatively, the fall and rise half-values of the notch filter may be set at 575 nm and 605 nm with the efficiency given preference.

In this case, the light of wavelengths between the half-values of the pre-stage and post-stage specific-wavelength converter elements is cut off, but led to the S-polarized light incidence side (G-use reflective video display device side) where the contrast is better. Specifically, the pre-stage and post-stage specific-wavelength converter elements 20*c*, 20*d* are set at 610 nm, 570 nm, respectively so that the half value of the post-stage plate is close to 550 nm. Under this condition, the contrast characteristic of PBS 19 acts more sufficiently to the S-polarized light incidence than to the P-polarized light incidence. Thus, the off-light can be cut off when S-polarized light is incident, leading to the improvement in contrast.

The R, G-use ¼ wavelength phase difference plates 23*r*, 23*g* are set at values within substantially the central region between the bands of G and R. Specifically, the band of R ranges from 600 nm to 680 nm, and the band of G from 510 nm to 580 nm. Thus, the wavelengths at which the ¼-wavelength phase-difference plates are set exist within the band of the complementary color therebetween, or yellow, for example, in a region from 580 nm to 620 nm. This is because the specific-wavelength converter elements 20 and PBS 19 have leakage of light, which causes the colors of light to the other adjacent display devices 13 to be incident to each display device 13 in addition to the original color. In other words, according to this embodiment, R light in addition to G light is incident to the G-use reflective video display device, and G light in addition to R light to the R-use reflective video display device. Thus, with this construction, the contrast can be effectively improved, and also the black color balance can be enhanced.

Or the wavelength at which the R-use ¼-wavelength phase-difference plate 23*r* is set lies within a green-wavelength region. The wavelength at which the R-use ¼-wavelength phase-difference plate 23*r* is set lies, for example, between 530 nm and 570 nm. This is because the specific-wavelength converter elements 20 and the PBS 19 have leakage of light, which causes the colors of light to the adjacent display devices to be incident to each display device 13 in addition to the original color. In other words, according to this embodiment, G light in addition to R light is incident to the R-use reflective video display device 13*r*. Here, the G light more reduces the contrast by the effect of visibility. With this construction, the contrast can be effectively improved, and the black color balance can be enhanced.

The PBS 19*w* combines B light and RG light on its polarization separation film surface 19*wa*, and supplies the mixture to the projection lens side with the yellow light cut off by reflection.

The projection lens 12 causes the images formed on the reflective video display devices 13*r*, 13*g*, 13*b* to be magnified and projected on the screen, thus achieving the function of the display apparatus.

For example, since the PBS 19 generally more reduces the contrast to the P-polarized light incidence than to the S-polarized light incidence, the contrast of R is somewhat lower than that of G. If a red-use polarizing plate (not shown) is placed after the exit of the PBS 19*rg*, the contrast of R can be increased, and the contrasts of respective colors can be balanced, thus leading to the improvement in the black color balance on the screen.

In this embodiment, the B light path, as compared with the R, G light path, does not include the pre-stage and post-stage specific-wavelength converter elements 20, but has the dichroic filter 14 and ½-wavelength phase-difference plate 5. In general, the dichroic filter, as compared with the notch filter, is able to reduce the number of layers to increase the transmissivity the more, so that the efficiency of the B light path is higher than that of R, G light path. Moreover, since the specific-wavelength converter elements 20 and ½-wavelength phase-difference plate 5 have substantially the same efficiency so that the efficiency of the B light path is, by one-sheet equivalent, higher than that of the G, R light path. Thus, when the blue B of light distribution R, G, B emitted from the light source unit 1 has the smallest amount of light, use of this construction will prevent the white balance on the screen from being deteriorated due to the color distribution from the light source unit 1.

Figure 12:
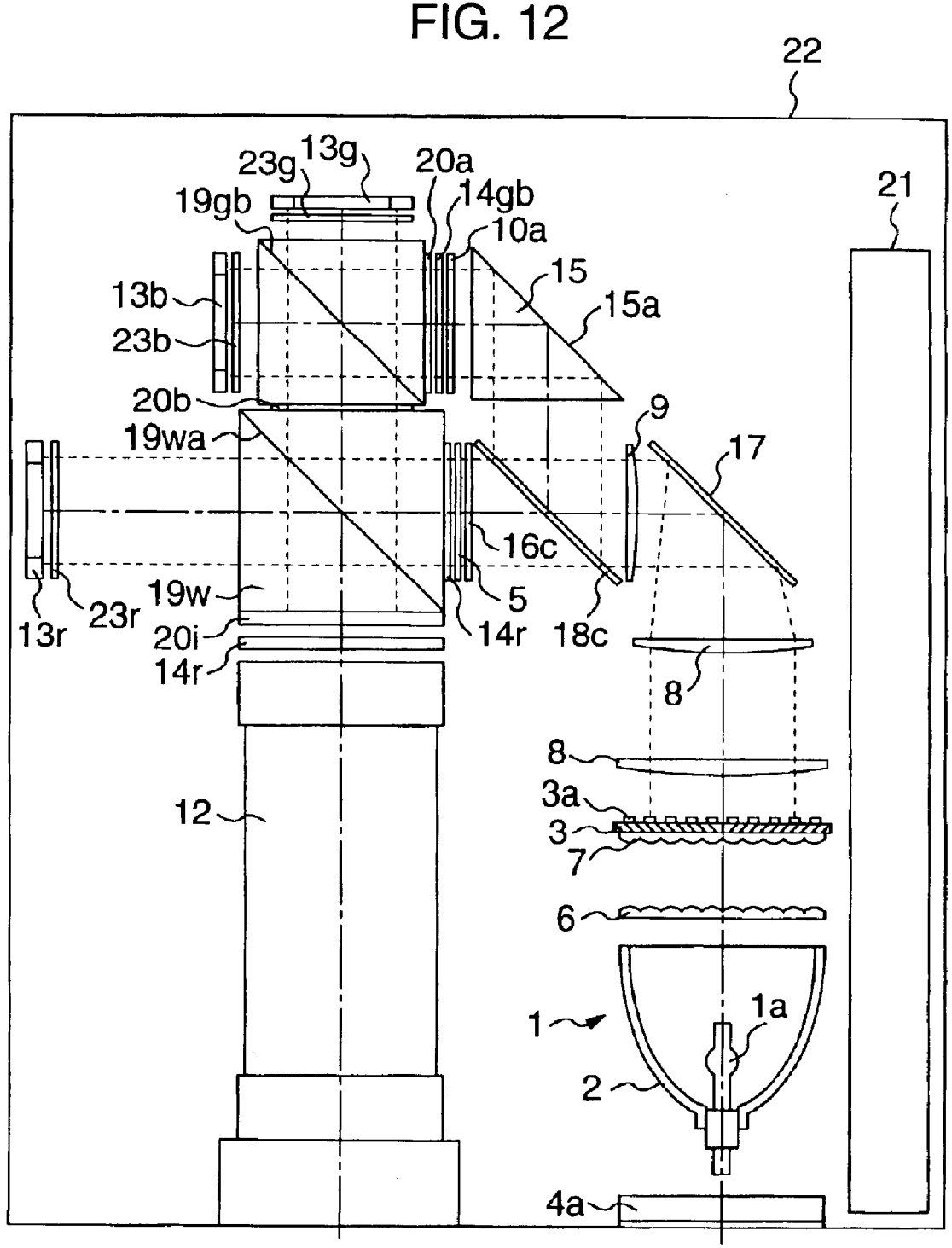
FIG. 12 is a construction diagram of the third embodiment of the projection-type video display apparatus according to the invention.

FIG. 12 is a construction diagram of the optical system of another embodiment of the projection-type video display apparatus 22 that uses the optical devices according to the invention. The construction of the elements from the light source 1*a* to the condenser lens 9 and the action of each component are the same as in the embodiment of FIG. 1. The construction and action of the pre-stage and post-stage specific-wavelength converter elements 20*a*, 20*b*, notch filter 10*a*, reflective video display devices 13 and projection lens 20 are also the same as in the embodiment of FIG. 1. This embodiment is greatly different from the other embodiments in that two PBSs are used in the color separation/combining unit. The light passed through the condenser lens 9 is first split into two parts, or GB light and R light by a color separation mirror 18*c*.

The R light, after exiting from the color separation mirror 18*c*, is incident to a dichroic filter 16*c*. This dichroic filter allows red light to pass and color of yellow to blue to reflect.

Then, the red light passes through the ½-wavelength phase-difference plate 5, thus converted to P-polarized light, and passes through the R-only incident light polarizing plate 14*r*, thus being incident to the PBS 19*w*. Since this light is P-polarized, it passes through the PBS 19*w* to arrive at the R-use reflective liquid crystal display device 13*r*, thus irradiating it. The B light and G light reflected from the color separation mirror 18*c* are incident to a triangular prism 15 provided for light path adjustment, reflected from its reflecting surface 15*a* to exit therefrom, and incident to the notch filter 10*a*. The triangular prism needs to have the optimum refractive index for the necessary light path length, and thus it is made of glass having a refraction index suitable for that purpose. The light passed through the notch filter 10*a* is incident to the GB-only polarizing plate 14*gb* that is set to cut off the P-polarized light. The light passed through the GB-only polarizing plate 14*gb* is incident to the specific-wavelength converter element 20*a*. The specific-wavelength converter element 20*a* causes the G light and the cyan light leaked from the notch filter to exit as they are S-polarized, and the B light to be converted to P-polarized light from S-polarized light and then to exit. The B light penetrates the polarization separation film surface of the GB-only PBS 19*gb*, irradiating the B-only reflective liquid crystal display device 13*b*. The G light and cyan light are reflected from the polarization separation film surface of the GB-only PBS 19*gb*, and then irradiate the G-use reflective liquid crystal display device 13*g*.

The drive signal from the outside changes the polarization angle of each pixel of the video display devices 13, and when the polarization directions of light coincide, the G light and B light are detected by the PBS 19*gb*, and R light by the PBS 19*w*. The relation between the PBS 19*gb*, 19*w* and the polarization degree determines the amounts of the light having the intermediate polarization angles to be detected by PBS. Thus, video images are displayed according to the input signal from the outside. At this time, when the display devices 13 display black, the polarization direction is substantially the same as the incident light, and the light is directly fed back to the light source side along the incident light path.

Then, the G light and cyan light of P-polarized light, and B light of S-polarized light are incident to the specific-wavelength converter element 20*b*. The converter element 20*b* changes the polarization of only B light and cyan light, so that the G light and B light as both P-polarized light and the cyan light as S-polarized light are incident to the PBS 19*w*. The R light and GB light are mixed on the polarization separation film surface 19*wa* of PBS 19*w*, and exit toward the projection lens side with the cyan light reflected cut off. An optical element 20*i* for converting the polarization direction of a specific wavelength region is inserted on the exit side of the PBS, converts only blue light by 90 degrees so as to make the polarization directions of all light uniform. The blue-use polarizing plate 14*b* is placed thereafter to increase the polarization degree.

Figure 13:
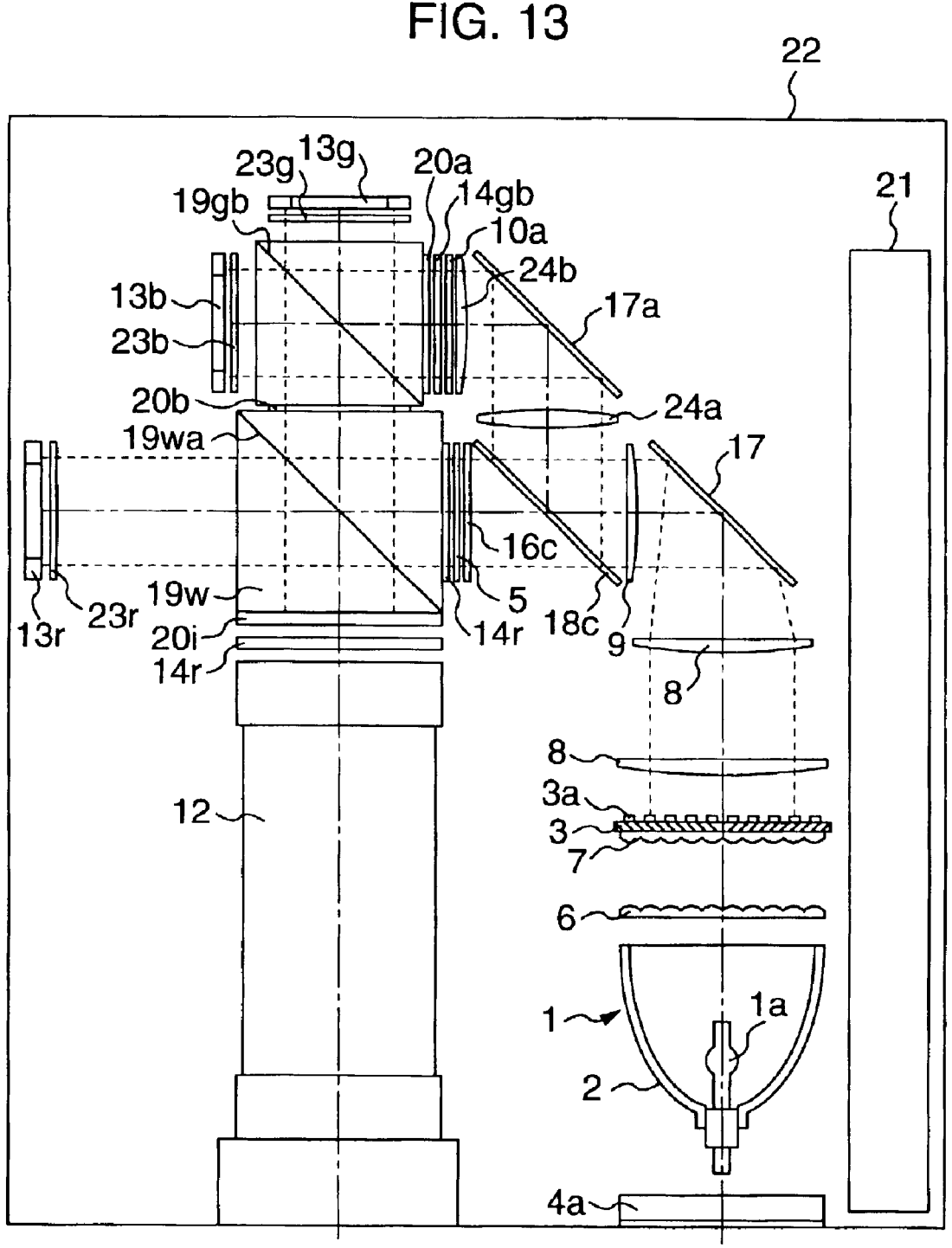
FIG. 13 is a construction diagram of the fourth embodiment of the projection-type video display apparatus according to the invention.

FIG. 13 shows another embodiment of the invention. The construction except that mentioned below is the same as in FIG. 12. Here, a reflecting mirror 17*a* is used in place of the triangular prism for light path adjustment. The light path length up to the G-use reflective liquid crystal display device 13*g*, relative to the condenser lens 9 of the illumination system, is different from that up to the R-use reflective liquid crystal display device 13*r*. Use of different light path lengths makes different the illumination intensity distributions of the G-use display device 13*g* and R-use display device 13*r*. As a result, if an optimum optical system is tried to design for any one of the video display devices, the peripheral illumination intensity on the other display device is reduced or the peripheral lighting intensity decreases. In order to avoid this reduction, it is necessary to increase the margin of the region to be irradiated, and thus the brightness will be decreased. Thus, relay lenses 24*a*, 24*b* are placed in order to avoid this reduction.

Thus, it is possible to provide the projection type display apparatus in which the contrast can be improved by the fact that the band between the wavelengths of light of which the polarizations are converted at 50-% efficiency by the pre-stage and post-stage specific-wavelength converter elements overlaps on the band to be cut off by the notch filter.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A projection-type video display apparatus comprising:
   a light source unit which emits light;
   video display devices as light bulb means which forms optical images according to a video signal;
   an illumination optical system which causes, the light from said light source unit to be irradiated onto said video display devices;
   a color separation/combining unit which separates the light for separation and into a plurality of color light, and combines the light reflected from said video display devices; and
   a projector which projects the combined light,
   said color separation/combining unit comprising:
      a predetermined-band cutting-off element which cuts off only a predetermined wavelength band of incident light;
      at least one polarization separation element which separates light into transmitted light and reflected light by polarization; and
      at least two specific-wavelength converter elements which convert the polarization of only specific-wavelength lights, the first one of which is placed on said light source unit side of said polarization separation element, and the second one of which is placed on said projection means side of said polarization separation element,
   said video display devices being placed on the sides on which the light from said light source unit is transmitted through and reflected from the separation surface of said polarization separation element, and
   the band between a wavelength of light to which the polarization converting efficiency of said first specific-wavelength converter element is about 50% and another wavelength of light to which the polarization converting efficiency of said second specific-wavelength converter element is about 50% includes the same band as does said predetermined band to be cut off by said predetermined-band cutting-off element.

2. A projection-type video display apparatus according to claim 1, wherein said predetermined-band cutting-off element is placed so that its light-incident surface can be substantially perpendicular to the optical axis of incident light.

3. A projection-type video display apparatus comprising:
   a light source unit which emits light;
   video display devices as light bulbs which forms optical images according to a video signal;
   an illumination optical system which causes the light from said light source unit to be irradiated onto said video display devices;
   a color separation/combining unit for separation and combining of colors; and
   projection means which causes light from said video display devices to be projected,
   said color separation/combining unit comprising:
      a predetermined-band cutting-off element which cuts off only a predetermined wavelength band of incident light;
      a color separation element which splits incident light into two parts of color light;
      at least one polarization separation element which separates light into transmitted light and reflected light by polarization; and
      at least two specific-wavelength converter elements which rotates the polarization of only specific wavelengths, a first specific-wavelength converter element being placed on said light source unit side of said polarization separation element, and a second specific-wavelength converter element being placed on said projection means side of said polarization separation element, said video display devices being placed on the sides on which the light from said light source unit is transmitted through and reflected from the separation surface of said polarization separation element, one of said two parts of color light separated by said color separation element being incident to one of said video display devices, the polarization of a specific wavelength of the other part of color light being rotated by said first specific-wavelength converter element, said two colors of light, after being separated by said polarization separation element, being incident to said video display devices concerned with said colors of light, the wavelength at the boundary between said two colors of light separated by said polarization separation element being included within said band to be cut off by said predetermined-band cutting-off element.

4. A projection-type video display apparatus according to claim 3, wherein the smallest-intensity one of the spectral component colors R, G, B of the light emitted from said light source unit is equal to the component color separated by said color separation element and caused to be incident to said one video display device.

5. A projection-type video display apparatus comprising:

a light source unit which emits light;

video display devices as light bulb means which forms optical images according to a video signal;

an illumination optical system which causes the light from said light source unit to be irradiated onto said video display devices;

a color separation/combining unit which separates and combining of colors; and projection means which causes the light from said video display devices to be projected, said color separation/combining unit comprising:

a predetermined-band cutting-off element which cuts off only a predetermined wavelength band of incident light;

at least one polarization separation element which separates light into transmitted light and reflected light by polarization; and at least two specific-wavelength converter elements which rotates only the polarization of specific wavelengths, the first one of which is placed on said light source unit side of said polarization separation element, and the second one of which is placed on said projection means side of said polarization separation element, said video display devices being placed on the sides on which the light from said light source unit is transmitted through and reflected from the separation surface of said polarization separation element, and light of the band between a wavelength of light to which the polarization changing efficiency of said first specific-wavelength converter element is about 50% and another different wavelength of light to which the polarization converting efficiency of said second specific-wavelength converter element is about 50% is caused to exit as substantially S-polarized light.

6. A projection-type video display apparatus according to claim 5, wherein said wavelength of light to which the polarization converting efficiency of said second specific-wavelength converter element is about 50% is closer to 550 nm than said wavelength of light to which the polarization converting efficiency of said first specific-wavelength converter element is about 50%.

7. A projection-type video display apparatus according to claim 1, wherein a converter element which cuts off only a specific polarized light is placed between said specific-band cutting-off element and said first specific-wavelength converter element.

8. A projection-type display apparatus according to claim 1, wherein the band cut off by said predetermined-band cutting-off element includes a band between 490 nm and 500 nm.

9. A projection-type display apparatus according to claim 1, wherein the band cut off by said predetermined-band cutting-off element includes a band between 580 nm and 590 nm.

10. A projection-type display apparatus according to claim 3, wherein the other color light separated by said color separation element, and made to be incident to said first specific-wavelength converter element is green and blue.

11. A projection-type display apparatus according to claim 1, wherein said polarization separation element is designed to, when black is displayed, hold a high contrast to an incident band of substantially S-polarized color light and a high contrast to an incident band of substantially P-polarized color light.

12. A projection-type display apparatus according to claim 1, wherein said color separation/combining unit further includes at least one reflective polarizing plate.

13. A projection-type display apparatus according to claim 1, wherein said video display devices are three different video display devices, said color separation/combining unit has at least three polarization separation elements, and any one of the light paths along which the color light rays are caused to exit from said three video display devices toward a projection lens includes a light path that transmits through said polarization separation elements.

14. A projection-type display apparatus according to claim 1, wherein said color separation/combining unit has at least two polarization separation elements, and the light path along which the lowest-contrast color light of R, G, B exits from said corresponding video display device toward said projection means includes a light path that transmits through said at least two polarization separation elements.

15. A projection-type display apparatus according to claim 1, wherein said color separation/combining unit has at least two polarization separation elements, the light path along which the green light separated by said color separation/combining unit exits from said corresponding video display device toward said projection means includes a light path that transmits through said at least two polarization separation elements.

16. A projection-type display apparatus according to claim 3, wherein the wavelength region at which ¼-wavelength phase-difference plates are set, said plates being placed on the light-incident sides of said video display devices to which the two colors of light separated by said polarization separation element are respectively incident, is substantially intermediate between said two color light bands.

17. A projection-type display apparatus according to claim 3, wherein said two colors of light separated by said polarization separation element include green color light as one part and blue or red color light as the other part, and the wavelength region at which a ¼-wavelength phase difference plate is set, said plate being placed on the light-incident side of said video display device to which the said blue or red color light is incident, includes the wavelength region of green color light.

18. A projection-type display apparatus according to claim 3, wherein a polarizing plate which cuts off only specific polarized light is placed between said specific-band, cutting-off element and said first specific-wavelength converter element.

19. A projection-type display apparatus according to claim 3, wherein said color separation/combining unit further includes at least one reflective polarizing plate.

20. A projection-type display apparatus according to claim 5, wherein said color separation/combining unit further includes at least one reflective polarizing plate.

* * * * *